US011948418B2

(12) United States Patent
Chen et al.

(10) Patent No.: US 11,948,418 B2
(45) Date of Patent: Apr. 2, 2024

(54) MONEY HANDLING APPARATUS

(71) Applicant: Glory Ltd., Himeji (JP)

(72) Inventors: Yang Chen, Himeji (JP); Keiju Nakagawa, Himeji (JP); Masahito Kawaguchi, Himeji (JP); Rinshiro Iwase, Himeji (JP); Tasuku Nakamoto, Himeji (JP)

(73) Assignee: GLORY LTD., Himeji (JP)

( * ) Notice: Subject to any disclaimer, the term of this patent is extended or adjusted under 35 U.S.C. 154(b) by 129 days.

(21) Appl. No.: 17/679,088

(22) Filed: Feb. 24, 2022

(65) Prior Publication Data

US 2022/0180687 A1 Jun. 9, 2022

Related U.S. Application Data

(63) Continuation of application No. PCT/JP2020/030683, filed on Aug. 12, 2020.

(30) Foreign Application Priority Data

Aug. 26, 2019 (JP) ................................ 2019-154150

(51) Int. Cl.
*G07D 11/245* (2019.01)

(52) U.S. Cl.
CPC ....... *G07D 11/245* (2019.01); *G07D 2211/00* (2013.01)

(58) Field of Classification Search
CPC ....... G07D 11/245; G07D 11/25; G07D 13/00
USPC .................................................. 235/7 R, 7 A
See application file for complete search history.

(56) References Cited

U.S. PATENT DOCUMENTS

| | | | | |
|---|---|---|---|---|
| 10,169,947 B1 * | 1/2019 | Sumner | G07D 11/245 |
| 2009/0229949 A1 * | 9/2009 | Nakamoto | G07D 9/065 194/302 |
| 2015/0178664 A1 * | 6/2015 | Neilan | G06Q 10/063114 705/7.15 |

(Continued)

FOREIGN PATENT DOCUMENTS

| | | | |
|---|---|---|---|
| JP | 3-43884 A | 2/1991 |
| JP | 7-249144 A | 9/1995 |

(Continued)

OTHER PUBLICATIONS

Machine translation of JP 7-249144, Yamashita et al., pp. 1-9 (Year: 1995).*

(Continued)

*Primary Examiner* — Paultep Savusdiphol
(74) *Attorney, Agent, or Firm* — XSENSUS LLP

(57) ABSTRACT

A money handling apparatus performs a money dispensing process, the money handling apparatus including a storage cassette, a plurality of storage units and processing circuitry. The storage cassette is detachably mounted to the money handling apparatus, and the storage cassette to store money for a replenishment process. The plurality of storage units store money. The processing circuitry is configured to receive a designation of a processing time of the replenishment process, and control the replenishment process based on the processing time so that a storage unit of the plurality of storage units is replenished with money fed out from the storage cassette.

20 Claims, 8 Drawing Sheets

(56) References Cited

U.S. PATENT DOCUMENTS

2018/0247479 A1 * 8/2018 Yamashita ............. G07D 11/20

FOREIGN PATENT DOCUMENTS

JP 7-334732 A 12/1995
JP 5841897 B2 1/2016

OTHER PUBLICATIONS

International Search Report and Written Opinion dated Oct. 20, 2020, received for PCT Application PCT/JP2020/030683, Filed on Aug. 12, 2020, 8 pages including English Translation.
Extended European Search Report dated Aug. 11, 2023, in corresponding European Patent Application No. 1 20859603.1.

* cited by examiner

MONEY HANDLING APPARATUS

CROSS REFERENCE TO RELATED APPLICATIONS

The present application is a bypass continuation of, and claims priority to, International application PCT/JP2020/030683, filed Aug. 12, 2020, which claims priority to JP 2019-154150, filed Aug. 26, 2019, the entire contents of each are incorporated herein by reference.

TECHNICAL FIELD

The present disclosure relates to a money handling apparatus for handling money.

BACKGROUND

Conventionally, a money handling apparatus provided with a cassette detachably mounted thereto has been used. For example, the cassette is used for replenishing the money handling apparatus with money. In a replenishment process, money fed out from the cassette is stored in a storage unit of the money handling apparatus.

For example, the money handling apparatus stores, in the storage unit, money deposited through a depositing process. Moreover, the money handling apparatus performs a dispensing process by using the money stored in the storage unit. In the dispensing process, money, of which the dispensing is requested by a user, is fed out from the storage unit and discharged from the apparatus. When the money in the storage unit becomes insufficient, the money handling apparatus cannot perform the dispensing process. Therefore, a money replenishment process needs to be performed before the money in the storage unit becomes insufficient. For example, a conventional money handling apparatus that automatically performs a replenishment process when the quantity of money in a storage unit becomes equal to or less than a predetermined quantity.

SUMMARY

In one aspect of the present disclosure, a money handling apparatus to perform a money dispensing process, the money handling apparatus comprising a storage cassette detachably mounted to the money handling apparatus, the storage cassette to store money for a replenishment process; a plurality of storage units to store money; and processing circuitry configured to receive a designation of a processing time of the replenishment process, and control the replenishment process based on the processing time so that a storage unit of the plurality of storage units is replenished with money fed out from the storage cassette.

DETAILED DESCRIPTION OF THE DRAWINGS

Figure 1:
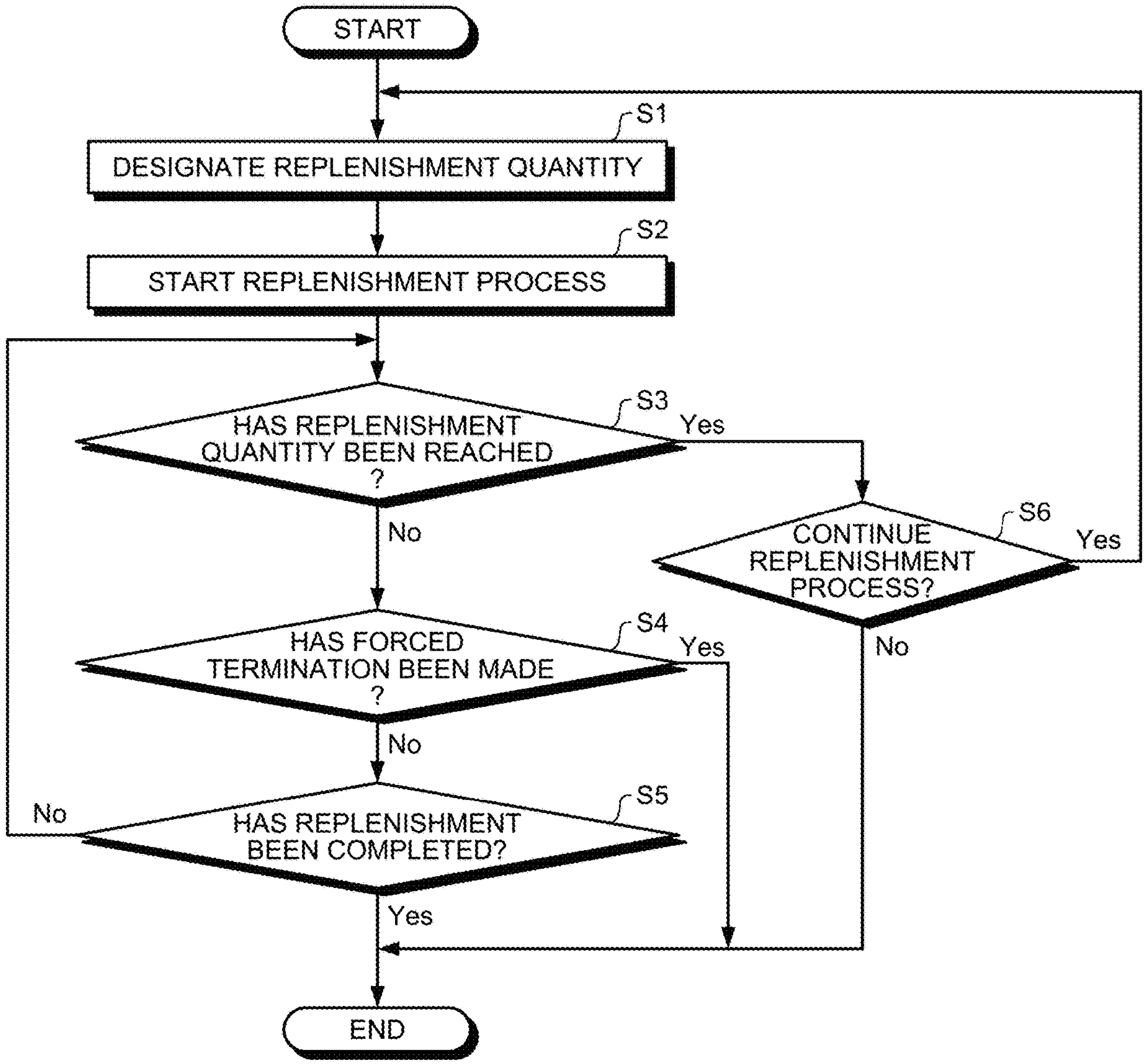
FIG. 1 is a flowchart showing a process flow of a replenishment process performed by a money handling apparatus according to an embodiment.

The inventors of the present disclosure have recognized that an execution of money handling processes may be restricted by a replenishment process. A money handling apparatus may not be able to perform a depositing process and a dispensing process while a replenishment process is performed. For example, when the money handling apparatus is used for a transaction with a customer in a store, if the replenishment process is performed over a long period of time in the money handling apparatus that is to be used for the depositing process and dispensing process in the transaction, then the customer will have to wait for the replenishment process to end.

The inventors have developed new technologies included in the present disclosure to address these issues. In particular, the inventors have developed, as in this disclosure, a money handling apparatus capable of changing the processing time of the money replenishment process.

Hereinafter, a money handling apparatus according to the present disclosure will be described with reference to the accompanying drawings. The money handling apparatus can handle at least one of banknotes and coins. The money handling apparatus can be used for various purposes in various places. An embodiment of an example in which the money handling apparatus is installed in a store and used for checkout when transaction is made between the store and a customer, will be described.

An outline of the money handling apparatus according to the present embodiment will be described. The money handling apparatus is installed at a checkout counter in the store and used for a process of depositing money received from the customer and a process of dispensing change to be returned to the customer. The money handling apparatus performs a process of replenishing a storage unit with money when money stored in the storage unit becomes insufficient. A user of the money handling apparatus can designate a replenishment quantity before the replenishment process is started. For example, the user can designate the replenishment quantity by a processing time of the replenishment process. The user can also designate the replenishment quantity by a quantity of money to be handled in the replenishment process. For example, the user can change the processing time of the replenishment process by designating a quantity of money of a specific denomination to be supplied to the money handling apparatus during the replenishment process. The user, by designating the replenishment quantity, can change the processing time of the replenishment process performed in the money handling apparatus. Furthermore, the user can change the replenishment quantity after the replenishment process has been started. The user can end the replenishment process in the middle by performing an operation of forced termination during execution of the replenishment process. Thus, the user can change the processing time of the replenishment process even after the replenishment process has been started.

FIG. 1 is a flowchart showing a process flow of the replenishment process performed by the money handling apparatus according to the present embodiment. The money handling apparatus monitors the quantity of money stored in the storage unit installed inside the apparatus. The money in the storage unit is used for the dispensing process. When the money in the storage unit decreases and the money replenishment process is required, the process shown in FIG. 1 is started. The user of the money handling apparatus can designate a replenishment quantity before the replenishment process is started (step S1). The money handling apparatus starts the replenishment process, based on the replenishment quantity designated by the user (step S2), and continues the process until a quantity of processed money reaches the replenishment quantity (step S3; No).

The user can designate the replenishment quantity by the processing time of the replenishment process. For example, when the user designates the processing time of the replenishment process to be 3 minutes, the money handling apparatus performs the replenishment process until the designated time (3 minutes) elapses. When the designated time has elapsed, the money handling apparatus ends the replenishment process even if replenishment of the storage unit with money is not completed. For example, if the designated time (3 minutes) elapses when the storage unit has been replenished with 30 coins after the replenishment process for replenishing the storage unit with 100 coins was started, the money handling apparatus ends the replenishment process in the middle although the remaining 70 coins have not been supplied to the storage unit. While this disclosure extensively discusses coins, other forms of currency may be handled by the money handling apparatus, such as paper currency and electronic currency and such other forms of currency are covered in the scope of this disclosure in place of the discussed coins.

The user can designate the replenishment quantity by the quantity of money to be processed in the replenishment process. In a case where a storage unit that stores money to be dispensed is replenished with money fed out from a replenishment money storage unit that stores money for replenishment, the user can designate the replenishment quantity, by the quantity of money to be fed out from the replenishment money storage unit or the quantity of money with which the storage unit is to be replenished. For example, when the user designates the number of coins, with which the storage unit is replenished, to be 10, the money handling apparatus performs the replenishment process until the storage unit is replenished with 10 coins. For example, even when the storage unit needs to be replenished with 100 coins, the money handling apparatus ends the replenishment process when the storage unit has been replenished with 10 coins.

The user can designate the denomination of money for replenishment. For example, when the user designates the denomination and quantity of money with which the storage unit is to be replenished, the money handling apparatus performs the replenishment process until the storage unit is replenished with the designated quantity of money of the designated denomination. In a case where the denomination of money fed out from the replenishment money storage unit is not included in the target denominations of the replenishment process, the money handling apparatus can be set such that the non-target money is returned to the original storage unit or stored in another storage unit, if any, capable of storing the money, which will be described later in detail.

The user can forcibly end the replenishment process in the middle of the replenishment process (step S4; Yes). For example, if a depositing process is required to be performed in the money handling apparatus after starting the replenishment process, the user can end the replenishment process in the middle by performing an operation to instruct forced termination, and then can perform the depositing process.

When replenishment with money has been completed (step S5; Yes) without forced termination (step S4; No) before a quantity of money, with which the storage unit is replenished, reaches the replenishment quantity designated by the user (step S3; No), the replenishment process is ended. For example, in the case where the user designates, as the replenishment quantity, a processing time of 10 minutes to start the replenishment process for the storage unit to be replenished with 10 coins, and the replenishment of the storage unit with 10 coins is completed before elapsing 10 minutes from the start of the replenishment process, the money handling apparatus ends the replenishment process.

When the replenishment quantity designated by the user is not reached (step S3; No) and there is no instruction of forced termination (step S4; No), the replenishment process is continuously performed until the replenishment of the storage unit with money is completed (step S5; No).

When the replenishment quantity designated by the user is reached before the replenishment of the storage unit with money is completed, the money handling apparatus ends the replenishment process (step S3; Yes). At this time, the user can select whether to actually end the replenishment process or continue the replenishment process (step S6). When the user performs an operation to instruct continuation of the replenishment process (step S6; Yes), the process returns to step S1 and the user can continue the replenishment process by, for example, designating a replenishment quantity, i.e., by changing the replenishment quantity that has been designated before the start of the replenishment process. When the user selects to end the replenishment process (step S6; No) or a predetermined time has elapsed without a user's operation, the replenishment process is ended. The money handling apparatus can receive a change in the replenishment quantity at another timing during the replenishment process, which will be described later in detail.

Although FIG. 1 shows the example in which the replenishment quantity is designated during the replenishment process, a timing to designate the replenishment quantity is not particularly limited. For example, the user may prepare in advance a default setting in which replenishment quantities are designated. Thus, when the quantity of money currently stored in the storage unit becomes less than a predetermined quantity, the money handling apparatus can automatically start the replenishment process according to the default setting. The money handling apparatus can store therein a plurality of types of settings of different replenishment quantities. For example, before the store is opened, the user selects a setting corresponding to a desired replenishment quantity from among the plurality of types of settings. Thus, after the stored is opened, when the quantity of money currently stored in the storage unit becomes less than the predetermined quantity, the money handling apparatus can automatically start the replenishment process according to the selected setting.

As described above, the user can designate the replenishment quantity by time, the quantity of money, or the quantity of money for each denomination before starting the money replenishment process in the money handling apparatus. Furthermore, after starting the replenishment process, the user can change the replenishment quantity designated before starting the replenishment process. Moreover, the user can forcibly end the replenishment process after the start of the replenishment process.

When the designated replenishment quantity has been reached, the money handling apparatus ends the replenishment process. The money handling apparatus ends the replenishment process even during the process, when an operation to instruct forced termination is made. The user can change the processing time of the replenishment process by designating a replenishment quantity or forcibly ending the replenishment process in the middle. During execution of the replenishment process, the money handling apparatus does not perform the depositing process and the dispensing process. However, the user can change the processing time of the replenishment process to end the process and perform the depositing process and the dispensing process after ending the replenishment process.

The replenishment process with the replenishment quantity being designated will be specifically described by using an example of a coin handling apparatus (money handling apparatus). The replenishment quantity can be set by designating a time, the number of coins, or the coins of a specific denomination to be replenished (designated by the denomination and the time, or the denomination and the number of coins). Since the content of the replenishment process is the same in any of the above cases, the case of designating the time will be described below as an example. In the case of designating the replenishment quantity by the number of coins, a determination process based on the designated time described below will be performed based on the designated number of coins.

Figure 2:
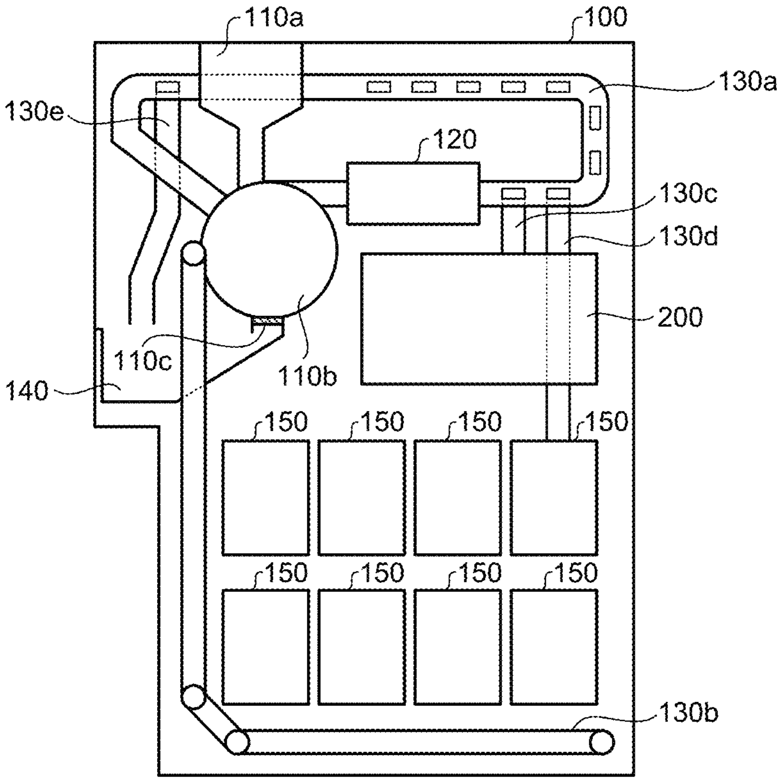
FIG. 2 is a cross-sectional view schematically showing an internal configuration of a coin handling apparatus.

FIG. 2 is a cross-sectional view schematically showing the internal configuration of a coin handling apparatus 100, which is an exemplary implementation of a money handling apparatus of the present disclosure. However, a money handling apparatus in accordance with the present disclosure may be a coin handling apparatus or another apparatus that handles other types of currency, such as paper currency or electronic currency. Additionally, the following discussion relating of a coin handling apparatus 100 may relate to money handling apparatus that handle other forms of currency as well.

The coin handling apparatus 100 includes a depositing unit 110 (110*a* to 110*c*), a recognition unit 120, a transport unit 130 (130*a* to 130*e*), a dispensing unit 140, a plurality of storage units 150, and a cassette 200.

The depositing unit 110 includes: an inlet 110*a* into which coins are inserted; a feeding unit 110*b* which receives the coins from the inlet 110*a* and feeds out the coins to a transport path of an upper transport unit 130*a*; and a gate 110*c* which discharges the coins in the feeding unit 110*b* to the dispensing unit 140. In implementations handling other types of currency, the other types of currency may be inserted to inlet 110*a*, received by feeding unit 110*b* and fed to the transport path of upper transport 130*a*, and discharged by gate 110*c* and fed by feeding unit 110*b* to dispensing unit 140.

The transport unit 130 includes: the upper transport unit 130*a* which transports the coins fed out from the feeding unit 110*b*; and a lower transport unit 130*b* which receives the coins fed out from the storage units 150 and the cassette 200 and transports the coins to the feeding unit 110*b*. The transport unit 130 further includes a plurality of chutes 130*c* to 130*e* connected to the transport path of the upper transport unit 130*a*. The chute 130*c* connects the cassette 200 to the transport path. The chute 130*d* connects the storage units 150 to the transport path in a one-to-one relationship. FIG. 2 shows one chute 130*d*, but the chute 130*d* is disposed so as to correspond to each storage unit 150. The chute 130*e* connects the dispensing unit 140 to the transport path.

Figure 3A:
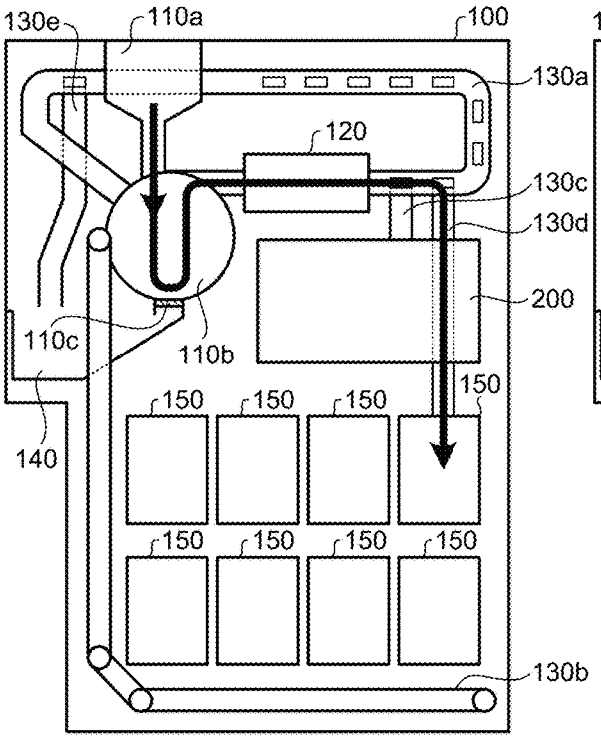
FIG. 3A schematically illustrates a depositing process performed in the coin handling apparatus.
Figure 3B:
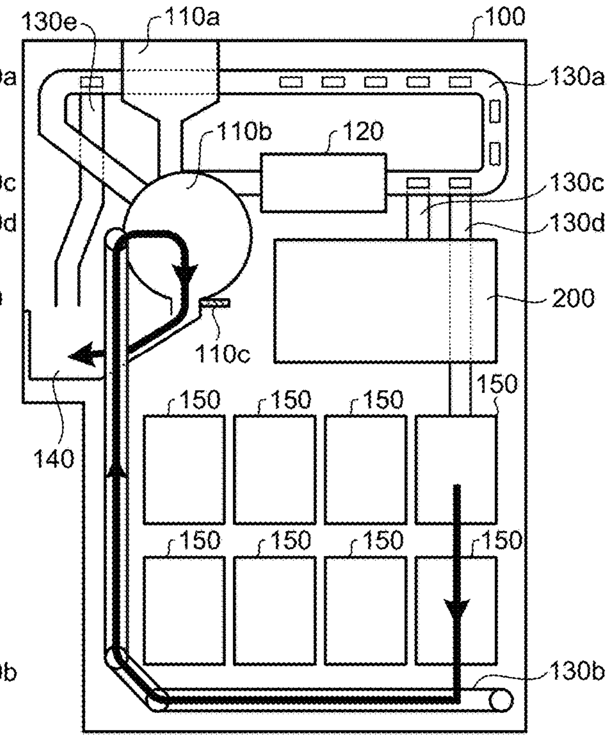
FIG. 3B schematically illustrates a dispensing process performed in the coin handling apparatus.
Figure 3C:
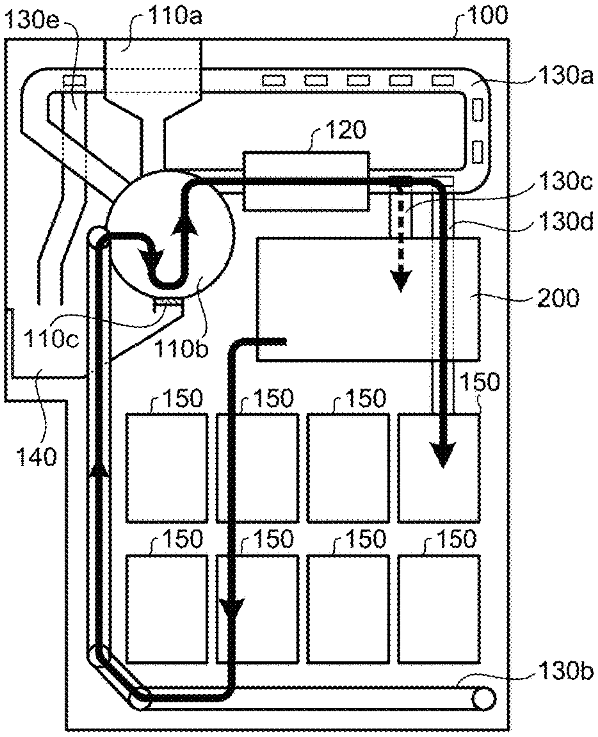
FIG. 3C schematically illustrates a replenishment process performed in the coin handling apparatus.

FIGS. 3A to 3C schematically illustrate, respectively, the depositing process, the dispensing process, and the replenishment process performed by the coin handling apparatus 100. The depositing process is illustrated in FIG. 3A. As shown by an arrow in FIG. 3A, in the depositing process, coins inserted into the inlet 110*a* drop into the feeding unit 110*b*. The feeding unit 110*b* can store therein a large number of coins and feed out the coins one by one to the transport path of the upper transport unit 130*a*. The coins fed out from the feeding unit 110*b* are transported one by one along the transport path by the upper transport unit 130*a*. The coins being transported along the transport path are recognized and counted by the recognition unit 120. The coins are dropped through the chute 130*d*, and are stored into the storage units 150 for each denomination. The arrow in FIG. 3A shows an example in which coins are stored into one storage unit 150, but the destination of each coin is determined according to the denomination of the coin. Coins are stored into the plurality of storage units 150 by denomination. Although not shown in FIG. 3A, if the storage unit 150 is full of coins and a coin cannot be stored therein, this coin drops through the chute 130*c* and is stored into the cassette 200.

The dispensing process is illustrated in FIG. 3B. As shown by an arrow in FIG. 3B, in the dispensing process, coins to be dispensed are fed out from the storage unit 150 and dropped onto a transport path of the lower transport unit 130*b*. The lower transport unit 130*b* transports the coins received on the transport path, to the feeding unit 110*b* in which the gate 110*c* is opened. The coins dropped into the feeding unit 110*b* are discharged through the gate 110*c* to the dispensing unit 140. The arrow in FIG. 3B shows an example in which coins are dispensed from one storage unit 150, but, from each of the storage units 150 corresponding to coins to be dispensed, coins corresponding to the number of coins to be dispensed are fed out and discharged to the dispensing unit 140.

The replenishment process is performed by using the cassette 200 detachably mounted to the coin handling apparatus 100. The cassette 200 is a storage cassette for storing coins such that the coins can be fed out therefrom. For example, before the store is opened, coins to be required during opening hours in one day are stored in the storage cassette in advance. The coins of a plurality of denominations are stored in a mixed state in the cassette 200 such that the plurality of storage units 150 for storing therein coins by denomination can be replenished with the coins of the cassette 200.

The replenishment process is illustrated in FIG. 3C. As shown by a solid-line arrow in FIG. 3C, in the replenishment process, coins fed out from the cassette 200 are dropped onto the transport path of the lower transport unit 130*b*. The lower transport unit 130*b* transports the coins received on the transport path, to the feeding unit 110*b*. The feeding unit 110*b* receives the coins from the lower transport unit 130*b*, stores the coins therein and feeds out the stored coins one by one to the transport path of the upper transport unit 130*a*. The fed out coins are recognized and counted by the recognition unit 120. In accordance with the recognition result, each of the coins is dropped through the corresponding chute 130*d* and stored into the corresponding storage unit 150. The solid-line arrow in FIG. 3C shows an example in which coins are stored into one storage unit 150, but the destination of each coin is determined based on the denomination of the coin. The coins are stored into the plurality of storage units 150 by denomination.

The cassette 200 stores therein a plurality of denominations of coins in a mixed state. Therefore, when replenishment is performed with coins of a specific denomination, a coin of a denomination that is not a replenishment target may be fed out from the cassette 200. In the coin handling apparatus 100, a method for handling a coin that is not the replenishment target can be changed by setting. Specifically, it can be set that, if the denomination of a coin recognized by the recognition unit 120 is not a replenishment target denomination, this coin is returned to the cassette 200 through the chute 130*c* as shown by a broken-line arrow in FIG. 3C. Also, it can be set that, if the coin, of which the denomination is not the replenishment target denomination, can be stored in a storage unit 150 corresponding to the denomination of this coin, this coin is stored in the corresponding storage unit 150. In this case, the coin handling apparatus 100 stores the coin that is not the replenishment target into the storage unit 150 corresponding to the denomination of this non-target coin until the number of coins currently stored in the corresponding storage unit 150 reaches a predetermined number. After the number of coins in the storage unit 150 corresponding to the non-target coin reaches the predetermined number, the coin handling apparatus 100 returns subsequent coins that are not the replenishment target into the cassette 200. For example, until the number of coins currently stored in each storage unit 150 reaches a predetermined number of coins that are set as change fund to be stored in the storage unit 150, the coin that is not the replenishment target is stored in the corresponding storage unit 150, and after the predetermined number has been reached, non-target coins are returned into the cassette 200.

Figure 4:
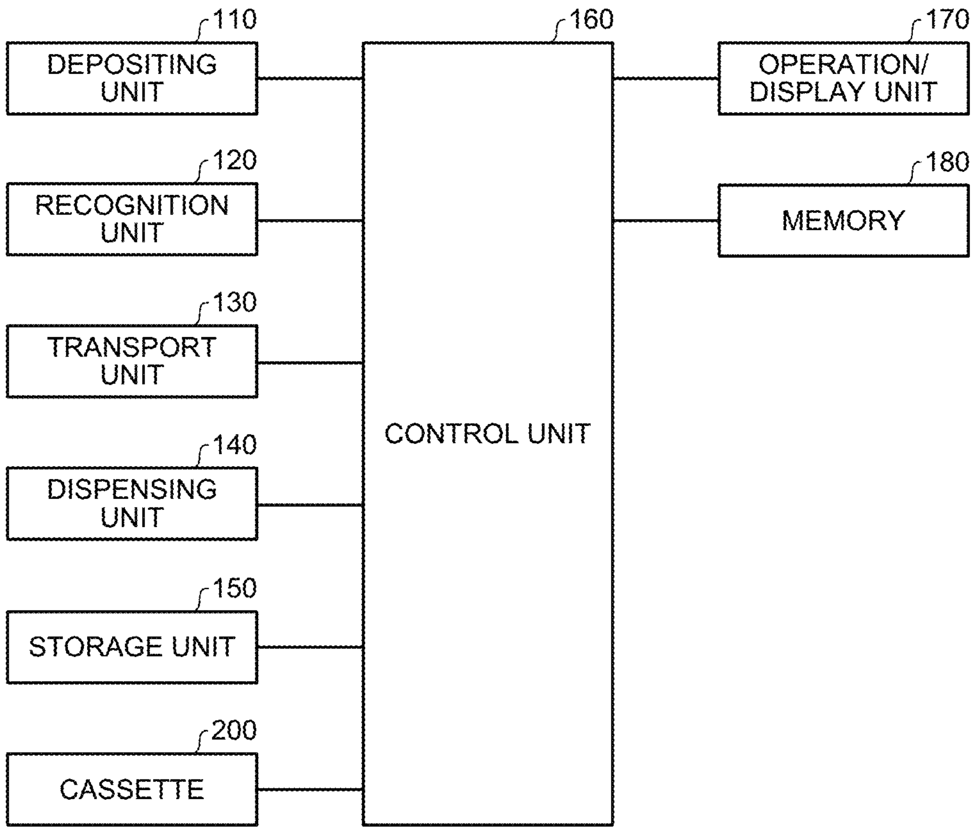
FIG. 4 is a block diagram schematically showing a functional configuration of the coin handling apparatus.

FIG. 4 is a block diagram schematically showing the functional configuration of the coin handling apparatus 100. The coin handling apparatus 100 includes a control unit 160, an operation/display unit 170, and a memory 180, in addition to the components shown in FIG. 2.

In an exemplary implementation, control unit 160 includes circuitry or processing circuitry, which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The operation/display unit 170 includes a touch panel, keyboard, mouse, or other input interface. The operation/display unit 170 further includes a display for outputting information. For example the operation/display unit 170 is, for example, a touch panel type liquid crystal display device. The operation/display unit 170 serves as an input interface for a user to input information on coin handling. The operation/display unit 170 also serves as a display that displays information on coin handling. As for the configuration of the operation/display unit 170, the input interface and the display may not necessarily be integrated with each other, and may be independent from each other.

The memory 180 is a nonvolatile storage device. Various kinds of information necessary for operation of the coin handling apparatus 100 are stored in the memory 180. For example, information on denominations of coins stored in the cassette 200 and the number of coins for each denomination in the cassette 200, is stored in the memory 180. In addition, for example, information on denominations of coins stored in the respective storage units 150 and the number of coins for each denomination in each storage unit 150, and information on the number of coins for replenishment start and the number of coins for replenishment, are stored in the memory 180.

The number of coins for replenishment start is a threshold value for determining whether or not the replenishment process is required. The number of coins for replenishment is the number of coins with which a storage unit 150 is replenished during the replenishment process. For example, the number of coins for replenishment start and the number of coins for replenishment are set for each storage unit 150. When the number of coins stored in a storage unit 150 decreases and reaches the number of coins for replenishment start that has been set for this storage unit 150, it is determined that the replenishment process is necessary, and the replenishment process is started. Then, this storage unit 150 is replenished with coins corresponding to the number of coins for replenishment.

Information for changing the number of coins for replenishment start and the number of coins for replenishment can be stored in the memory 180. At least one of the timing to start the replenishment process and the number of coins for the replenishment process can be changed based on this information. For example, if many 10-JPY coins may be deposited into the apparatus every Wednesday, the number of coins for replenishment start and the number of coins for replenishment on Wednesday can be set to be different from those on the other days of the week such that the storage unit 150 does not become full of the deposited 10-JPY coins, that is, more 10-JPY coins can be stored in the storage unit 150, on Wednesday. In a specific example, a setting on a processing time and the number of coins for the replenishment process on each day of the week, and a setting for decreasing by 10% the number of 10-JPY coins for the replenishment process on Wednesday are stored in the memory 180, whereby the number of 10-JPY coins for the replenishment process on Wednesday can be changed to 90% of the number of 10-JPY coins for replenishment on the other days of the week.

The control unit 160 controls the function and operation of each component of the coin handling apparatus 100. The control unit 160 receives information inputted through the operation/display unit 170, and performs various types of controls based on the inputted and received information. Moreover, the control unit 160 performs a control to output and display information on the operation/display unit 170. The control unit 160 controls each component while referring to the various types of information stored in the memory 180, thereby implementing the function and operation of the coin handling apparatus 100 described in the present embodiment.

Next, the operation of the coin handling apparatus 100 will be described. The control unit 160 of the coin handling apparatus 100 manages, in the memory 180, the denominations of coins and the number of coins for each denomination stored in the storage units 150, and the denominations of coins and the number of coins for each denomination stored in the cassette 200. In addition, the control unit 160 manages, in the memory 180, the number of coins for replenishment start and the number of coins for replenishment, which are set for each storage unit 150.

The store opens in a state where a preset number of coins are stored as change fund in each of the storage units 150 of the coin handling apparatus 100. While the store is open, depositing and dispensing of coins are performed in the coin handling apparatus 100. Since coins are more likely to be dispensed as change, the number of coins stored in each storage unit 150 decreases during opening hours of the store.

Each time the dispensing process is performed, the control unit 160 performs a control to determine whether or not the number of coins stored in each storage unit 150 becomes equal to or less than the number of coins for replenishment start that is set for each storage unit 150. When the number of stored coins becomes equal to or less than the number of coins for replenishment start, the control unit 160 performs a control to notify the user of the coin handling apparatus 100 that the replenishment process is required, based on the determination result. For example, the notification is performed by displaying information on the operation/display unit 170.

In an exemplary implementation, recognition unit 120 discussed above with respect to FIG. 2 may include a camera, imaging circuitry and/or processing circuitry to detect, recognize and count the coins and/or currency deposited into coin handling apparatus 100.

Figure 5A:
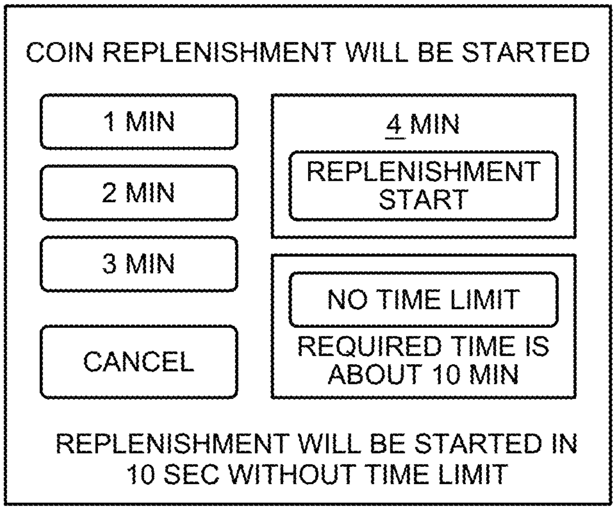
FIGS. 5A and 5B show examples of notification screens displayed on an operation/display unit.
Figure 5B:
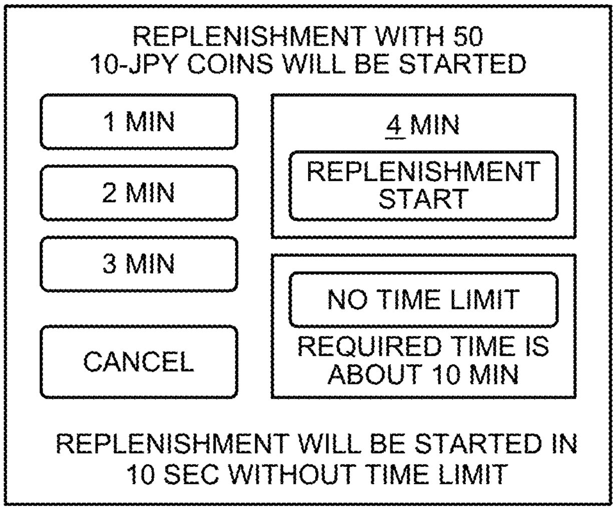

FIGS. 5A and 5B show examples of notification screens displayed on the operation/display unit 170. As shown in FIG. 5A, when the replenishment process is required, the control unit 160 displays, on the screen of the operation/display unit 170, information indicating that replenishment with coins is required, and buttons for designating a processing time (replenishment quantity) of the replenishment process. Alternatively, as shown in FIG. 5B, the denomination of coins determined to be supplied to the apparatus and the number of coins to be supplied may be displayed on the screen.

When the user presses a cancel button on the screen shown in FIGS. 5A and 5B, the control unit 160 does not perform the replenishment process. After cancelling the replenishment process by pressing the cancel button, the user can perform the depositing process and the dispensing process by using the coin handling apparatus 100. In the case where the user performs the cancel operation, the control unit 160 again performs determination on the number of coins in the storage unit 150 for which the replenishment process has been canceled, after a predetermined time has elapsed from the cancel operation. Since the depositing process may be performed by using the coin handling apparatus 100, there is a possibility that deposited coins are stored in the storage unit 150 for which it has been determined to replenish with coins, and thereby the number of coins stored in the storage unit 150 exceeds the number of coins for replenishment start. As a result of the redetermination, if the number of coins exceeds the number of coins for replenishment start, the control unit 160 returns to the normal monitoring state. If the number of coins remains less than the number of coins for replenishment start, the control unit 160 again displays the notification screen shown in FIG. 5A or 5B on the operation/display unit 170. The time from when the cancel operation is performed by the user to when the redetermination is performed by the control unit 160, can be changed through setting.

When the user presses a button indicating a time on the screen shown in FIG. 5A or 5B, the control unit 160 starts the replenishment process. When the time corresponding to the pressed button has elapsed, the control unit 160 ends the replenishment process. In the example shown in FIGS. 5A and 5B, the user can select a processing time of the replenishment process from among three types of buttons respectively indicating “1 min”, “2 min”, and “3 min”. For example, when the user presses the button indicating “1 min”, the control unit 160 starts the replenishment process, and ends the replenishment process after 1 minute has elapsed.

The user can also perform the replenishment process without limiting the time. When the user presses a button indicating “no time limit” on the screen shown in FIG. 5A or 5B, the control unit 160 performs the replenishment process without a time limit. In this case, the replenishment process is continued until replenishment of the storage unit 150 with coins is completed. As shown in FIGS. 5A and 5B, a standard time to be taken until completion of the replenishment process that is started without a time limit is displayed as a required time on the screen. The user can consider whether or not to limit the time of the replenishment process by checking the required time on the screen.

The user can also perform the replenishment process by inputting a processing time. The user can input any number into a numerical part of “4 min” shown in FIGS. 5A and 5B. When the user presses a replenishment start button after designating a time by inputting a number through the operation/display unit 170, the control unit 160 starts the replenishment process, and ends the replenishment process when the time manually designated by the user has elapsed.

When a predetermined time has elapsed while the user does not press any of the buttons on the screen shown in FIGS. 5A and 5B, the control unit 160 automatically starts the replenishment process. In the examples shown in FIGS. 5A and 5B, the replenishment process is automatically started if a button for selecting a next operation is not pressed even after the elapse of 10 seconds from the screen display, as indicated in a lower part of the screen. In this case, the control unit 160 performs the replenishment process without a time limit because the user has not designated a processing time.

The control unit 160 starts the replenishment process except for the case where the user presses the cancel button on the screen shown in FIGS. 5A and 5B. In the coin handling apparatus 100, it can be set that the user sets in advance a processing time of the replenishment process as a default setting, and the replenishment process is started based on the default setting. In this case, when it is determined that the replenishment process is required to be started, the screen shown in FIGS. 5A and 5B are not displayed, and the replenishment process is automatically started.

The control unit 160 having started the replenishment process determines whether or not a minimum replenishment process is required. The minimum replenishment process is a process of replenishing the storage units 150 with coins of which the denominations and the number for each denomination are set in advance as minimum money.

In the case where the coin handling apparatus 100 is used for dispensing change in a store in which transactions with customers are performed, replenishment with coins that are likely to be dispensed as change in one transaction is performed in the minimum replenishment process. For example, in the case where the coin handling apparatus 100 dispenses Japanese coins, the storage units 150 are replenished with one 500-JPY coin, four 100-JPY coins, one 50-JPY coin, four 10-JPY coins, one 5-JPY coin, and four 1-JPY coins, that is, fifteen coins of six denominations, of which the total amount is 999 JPY, in the minimum replenishment process. That is, in the minimum replenishment process, based on a plurality of denominations that can be dispensed from the storage units 150, coins of the respective denominations are supplied to the apparatus in a combination such that the total amount thereof becomes equal to the maximum amount (999 JPY) that may be dispensed as change coins in one transaction, and the total number thereof becomes minimum. However, the denominations and the number for each denomination of coins to be supplied in the minimum replenishment process may be set to those other than mentioned above. For example, in the above example, nine 10-JPY coins may be supplied without supplying 50-JPY coins. For another example, when the minimum amount of money for transactions in the store is 100 JPY, the total amount of coins to be supplied may be set to 900 JPY.

Usually, the coin replenishment process is performed when the number of coins stored in each storage unit 150 decreases and reaches the number of coins for replenishment start. However, if the user continues the cancel operation on the screen shown in FIG. 5A or 5B, the storage unit 150 may become empty. If the number of coins less than the number of coins for replenishment start is set in advance as a threshold number of coins for determining whether or not the minimum replenishment process is required, the control unit 160 determines whether or not the number of coins stored in each storage unit 150 is equal to or less than the threshold number of coins. If there is a storage unit 150 in which the number of coins is equal to or less than the threshold number of coins set for the minimum replenishment process, the control unit 160 determines that the minimum replenishment process is required.

Figure 6A:
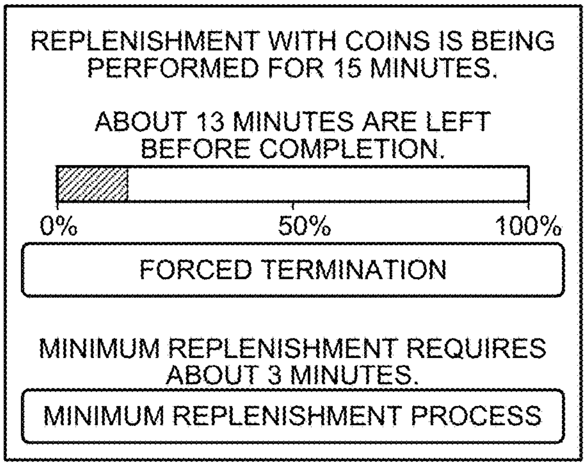
FIGS. 6A to 6E show examples of screens displayed when a replenishment process is started under a situation where a minimum replenishment process is required.

FIGS. 6A to 6E show examples of screens displayed on the operation/display unit 170 when the control unit 160 starts the replenishment process in the situation where the minimum replenishment process is required. When the user changes "4 min" to "15 min" on the screen shown in FIG. 5A or 5B and presses the replenishment start button, a screen shown in FIG. 6A is displayed.

As shown in FIG. 6A, information indicating a time designated by the user, information indicating that the coin replenishment process is being performed, information indicating a remaining time (estimated time) until the end of the replenishment process, information indicating the progress status of the replenishment process, and a forced termination button, are displayed on the screen. Since it is the situation where the minimum replenishment process is required, information related to the minimum replenishment process is also displayed on the screen. Specifically, a processing time required when the minimum replenishment process is performed, and a minimum replenishment button are displayed. In the examples of screens shown in FIGS. 6A, 6B, 7A and FIG. 8A, information indicating the progress status of the replenishment process is displayed as a progress bar.

Figure 6B:
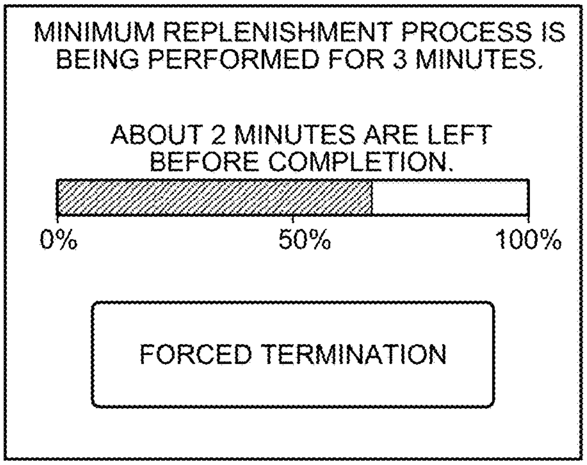

When the user presses the minimum replenishment button on the screen shown in FIG. 6A, the control unit 160 interrupts the replenishment process having been performed so far, and starts the minimum replenishment process. At this time, the screen shown in FIG. 6B is displayed on the operation/display unit 170. On the screen, information indicating that the minimum replenishment process is being performed, information indicating a time required until completion of the minimum replenishment process, information indicating the progress status of the minimum replenishment process, and a forced termination button, are displayed.

After the minimum replenishment process has been started, the user can forcibly end the process by pressing the forced termination button on the screen shown in FIG. 6B. Unless the user presses the forced termination button, the control unit 160 completes the minimum replenishment process and displays the screen shown in FIG. 6C on the operation/display unit 170. On the screen, information indicating that the minimum replenishment process has been completed, information asking whether or not to resume the replenishment process having been interrupted by the minimum replenishment button pressed on the screen shown in FIG. 6A, a replenishment resume button, and an end button, are displayed. When the user presses the end button on this screen, the control unit 160 ends the replenishment process. When the user presses the replenishment resume button, the control unit 160 resumes the replenishment process having been interrupted to perform the minimum replenishment process.

Figure 6C:
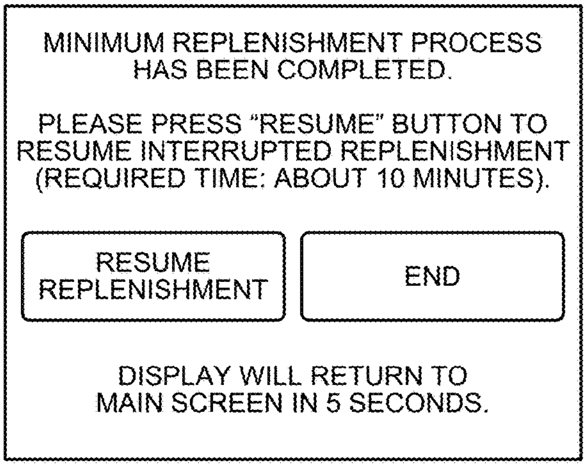
Figure 6D:
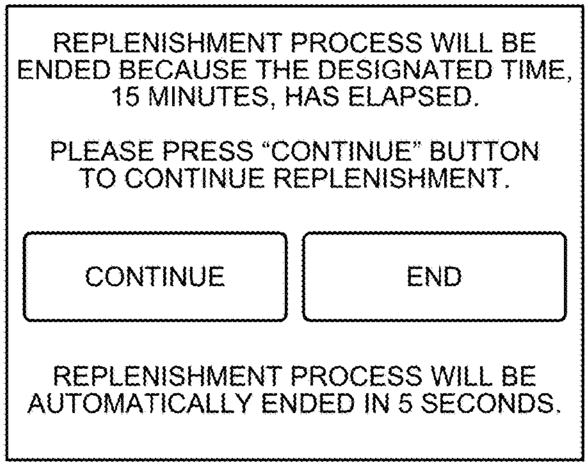

When the processing time (15 minutes) designated by the user has elapsed while the minimum replenishment button is not pressed on the screen shown in FIG. 6A, the control unit 160 displays the screen shown in FIG. 6D on the operation/display unit 170. On this screen, information indicating that the replenishment process is ended because the designated time has elapsed, information indicating that the replenishment process can be continued, a continue button, and an end button, are displayed.

When the user presses the end button on the screen shown in FIG. 6D, the control unit 160 ends the replenishment process. When the user presses the continue button, the control unit 160 again displays the screen shown in FIG. 5A or 5B on the operation/display unit 170. The user can continue the replenishment process by designating a processing time on this screen.

Figure 6E:
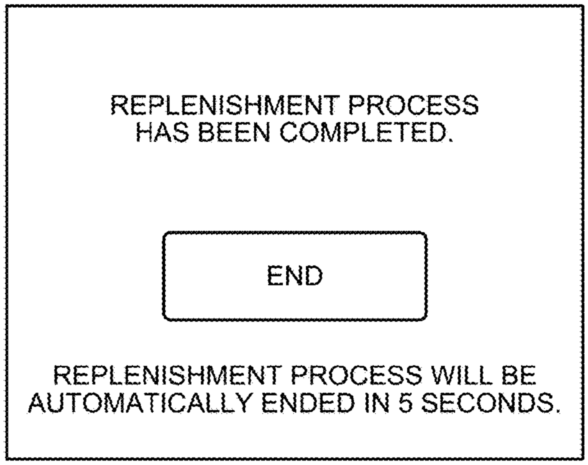

If the replenishment process is continued without being pressed the minimum replenishment button on the screen shown in FIG. 6A and the replenishment process for the storage unit 150 is completed before the elapse of 15 minutes, the control unit 160 displays the screen shown in FIG. 6E. On this screen, information indicating that the replenishment process has been completed, and an end button are displayed. When the user presses the end button on the screen shown in FIG. 6E, the control unit 160 ends the replenishment process.

When the predetermined time has elapsed while the user does not press any of the buttons on the screens shown in FIGS. 6C to 6E, the control unit 160 automatically ends the replenishment process. In the example shown in FIGS. 6C to 6E, the replenishment process is ended if a button for selecting a next operation is not pressed even after the elapse of 5 seconds from the screen display, as indicated in a lower part of the screen.

Figure 7A:
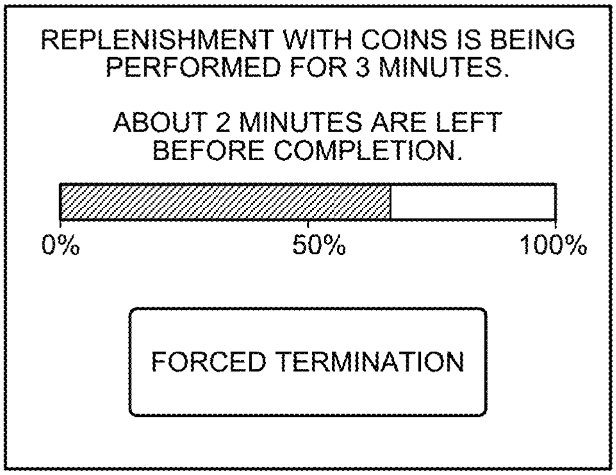
FIGS. 7A and 7B show other examples of screens displayed on the operation/display unit when a replenishment process is performed.
Figure 7B:
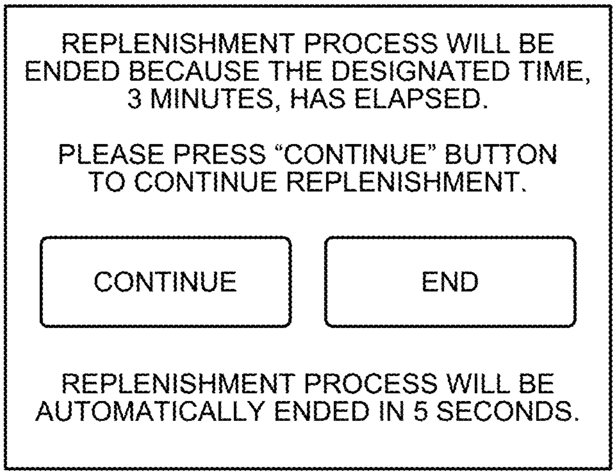

FIGS. 7A and 7B show other examples of screens displayed on the operation/display unit 170 when the replenishment process is performed. FIGS. 7A and 7B show a case where the minimum replenishment process is not required. Therefore, information on the minimum replenishment process is not displayed on the screen shown in FIG. 7A. When the user presses a button indicating "3 min" on the screen shown in FIG. 5A or 5B, a screen shown in FIG. 7A is displayed. On this screen, information indicating a time designated by the user, information indicating that the coin replenishment process is being performed, information indicating a remaining time (expected time) until the end of the replenishment process, information indicating the progress status of the replenishment process, and a forced termination button, are displayed.

The user can forcibly end the replenishment process by pressing the forced termination button on the screen shown in FIG. 7A. Unless the forced termination button is pressed, the control unit 160 continues the replenishment process until the time (3 minutes) designated by the user elapses.

When 3 minutes have elapsed from the start of the replenishment process, the control unit 160 displays the screen shown in FIG. 7B on the operation/display unit 170. On this screen, information indicating that the replenishment process is ended because the designated time has elapsed, information indicating that the replenishment process can be continued, a continue button, and an end button, are displayed.

When the user presses the end button on the screen shown in FIG. 7B, the control unit 160 ends the replenishment process. When the user presses the continue button, the control unit 160 again displays the screen shown in FIG. 5A or 5B on the operation/display unit 170. The user can continue the replenishment process by designating a processing time on the screen.

When the predetermined time has elapsed while the user does not press any of the buttons on the screen shown in FIG. 7B, the control unit 160 automatically ends the replenishment process. In the example shown in FIG. 7B, the replenishment process is ended if a button for selecting a next operation is not pressed even after the elapse of 5 seconds from the screen display, as indicated in a lower part of the screen.

If the replenishment process for the storage unit 150 is completed while continuing the replenishment process, the control unit 160 displays an end screen shown in FIG. 6E in the same way as in the case of automatically starting the replenishment process. When the user presses the end button on this screen or 5 seconds have elapsed after the screen display, the control unit 160 ends the replenishment process.

In the coin handling apparatus 100, the replenishment process can be manually started irrespective of whether or not the number of coins stored in a storage unit 150 has decreased and reached the number of coins for replenishment start. The operation/display unit 170 is provided with a replenishment button that allows the user to easily start the replenishment process during a spare time in which the depositing process and the dispensing process are not performed in the coin handling apparatus 100. The user can start the replenishment process by pressing the replenishment button.

When the user presses the replenishment button by operating the operation/display unit 170, the control unit 160 performs the replenishment process for a preset processing time. The processing time of the replenishment process can be changed by setting.

Figure 8A:
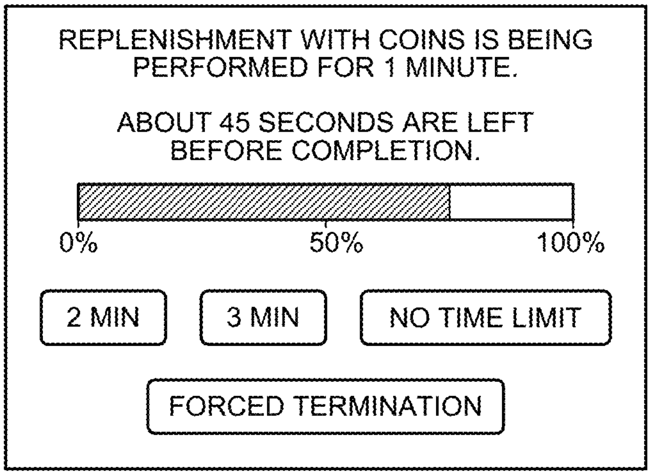
FIGS. 8A and 8B show examples of screens displayed on the operation/display unit when a replenishment process is started by pressing a replenishment button.
Figure 8B:
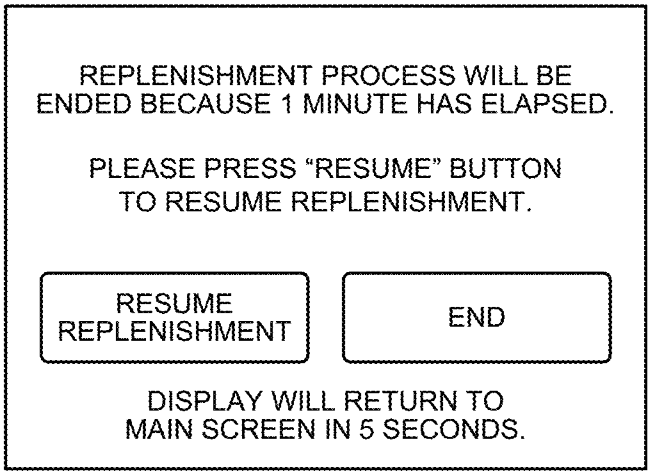

FIGS. 8A and 8B show examples of screens displayed on the operation/display unit 170 when the replenishment process is started by pressing the replenishment button. For example, if the processing time of the replenishment process when the replenishment button is pressed is set to 1 minute, the screen shown in FIG. 8A is displayed. On this screen, information indicating the predetermined processing time, information indicating that the replenishment process is being performed, information indicating the remaining time (estimated time) until the end of the replenishment process, and information indicating the progress status of the replenishment process, are displayed. Moreover, a button for changing the processing time of the replenishment process, and a forced termination button are displayed on the screen. When the user presses the forced termination button, the control unit 160 ends the replenishment process.

When the user presses a button indicating "2 min" on the screen shown in FIG. 8A, the control unit 160 changes the time of the replenishment process being performed, from 1 minute to 2 minutes. When the user presses a button indicating "3 min", the control unit 160 changes the time of the replenishment process being performed, from 1 minute to 3 minutes. When the user presses a button indicating "no time limit", the control unit 160 changes the time of the replenishment process being performed, from 1 minute to an unlimited time. Thus, the time (replenishment quantity) of the replenishment process can be changed in the middle of the replenishment process after starting the replenishment process.

After the replenishment process has been started with the screen shown in FIG. 8A, if 1 minute has elapsed while the button for changing the time of the replenishment process is not pressed, the control unit 160 ends the replenishment process and displays the screen shown in FIG. 8B on the operation/display unit 170. On this screen, information indicating that the replenishment process is ended because the designated time has elapsed, information indicating that the replenishment process can be continued, a continue button, and an end button, are displayed.

When the user presses the end button on the screen shown in FIG. 8B, the control unit 160 ends the replenishment process. When the user presses the continue button, the control unit 160 again starts the replenishment process for 1 minute and displays the screen shown in FIG. 8A on the operation/display unit 170.

If the replenishment process for the storage unit 150 is completed while continuing the replenishment process, the control unit 160 displays the end screen shown in FIG. 6E in the same way as in the case where the replenishment process is automatically started. When the user presses the end button on this screen or 5 seconds have elapsed after the screen display, the control unit 160 ends the manual replenishment process.

In the present embodiment, when the replenishment process is manually started, the replenishment process is performed for a preset processing time. However, also in the case where the control unit 160 automatically starts the replenishment process, the time of the replenishment process may be set to be selectable. With this setting, when the user presses the replenishment button for manually starting the replenishment process, the screen shown in FIG. 5A or 5B may be displayed. The user can perform the replenishment process by designating a processing time of the replenishment process on the screen.

In the present embodiment, after the replenishment process is manually started, the processing time of the replenishment process can be changed during the replenishment process. Also, when the control unit 160 automatically starts the replenishment process, the processing time may be set to be changeable during the replenishment process. With this setting, a plurality of buttons for changing the processing time are displayed on the screens shown in FIGS. 6A, 6B and 7A, in the same way as in the case of FIG. 8A. The user can change the processing time of the replenishment process being performed, by pressing any button to select a processing time.

The screen shown in FIG. 8A shows the case where the processing time of the replenishment process is extended. However, it can be set that the processing time of the replenishment process is reduced. For example, a button indicating “30 sec” may be displayed on the screen shown in FIG. 8A, and when this button is pressed, the processing time may be reduced from 1 minute to 30 seconds. Both a button for extending the processing time and a button for reducing the processing time may be displayed on the screen.

In the present embodiment, after the replenishment process has been ended with the replenishment quantity designated in advance, the screen that asks the user whether or not to continue the replenishment process is displayed as shown in FIGS. 6C, 6D, 7B and FIG. 8B. However, the screen that asks whether or not to continue the replenishment process may be displayed during the replenishment process. For example, after the replenishment process has been started with “1 minute” being designated, the screen is displayed after 50 seconds have elapsed. Then, if the user selects to end the replenishment process, the replenishment process is ended after 1 minute has elapsed. If the user selects to continue the replenishment process, the replenishment process is continued even after 1 minute has elapsed.

The present disclosure provides a money handling apparatus that is configured to perform a money dispensing process, and includes: a storage cassette detachably mounted to the money handling apparatus, and configured to store therein money for a replenishment process; a plurality of storage units configured to store therein money for the dispensing process; and a control unit configured to receive a designation of a processing time of the replenishment process in which the storage unit is replenished with the money fed out from the storage cassette, and control the replenishment process based on a designated processing time.

In the above configuration, when the control unit receives an instruction to change a replenishment quantity, after starting the replenishment process to be performed based on the designated processing time, the control unit performs a control to change the processing time of the replenishment process, based on the instruction.

In the above configuration, when the control unit receives an instruction to end the replenishment process during execution of the replenishment process, the control unit performs a control to end the replenishment process, based on the instruction.

In the above configuration, when the control unit receives an instruction to perform a minimum replenishment process in which a combination of a plurality of denominations of money, of which a total amount is a maximum amount as change that may be dispensed in one transaction, is designated as money with which the storage units are to be replenished, the control unit performs the minimum replenishment process.

In the above configuration, the money handling apparatus further includes a display unit configured to display a time required until the replenishment process is ended.

The money handling apparatus according to the present disclosure receives a designation of a processing time of a replenishment process, and performs the replenishment process, based on the designated processing time. A user can perform replenishment work according to the circumstances by changing the processing time of the replenishment process.

As described above, in the money handling apparatus according to the present embodiment, the replenishment quantity can be designated before the replenishment process is started. The money handling apparatus performs the replenishment process, based on the designated replenishment quantity. The user can change the processing time of the replenishment process performed in the money handling apparatus, by designating a processing time of the replenishment process or the quantity of money to be handled in the replenishment process, as a replenishment quantity.

The user can change the replenishment quantity after starting the replenishment process. The user can end the replenishment process in the middle by performing an operation of forced termination while performing the replenishment process. Thus, the user can change the processing time of the replenishment process after starting the replenishment process. After the replenishment process has been ended, the user can perform other money handling processes including the depositing process and the dispensing process by using the money handling apparatus. Since the processing time of the replenishment process to be performed in the money handling apparatus is changeable, it is possible to avoid a situation where the replenishment process is performed over a long period of time and other money handling processes cannot be performed.

The invention claimed is:

1. A money handling apparatus to perform a dispensing process, the money handling apparatus comprising:

a storage cassette detachably mounted to the money handling apparatus, the storage cassette to store money for a replenishment process;

a plurality of storage units to store money; and processing circuitry configured to receive a designation of a processing time of the replenishment process;

control execution of the replenishment process based on the processing time so that a storage unit of the plurality of storage units is replenished with money fed out from the storage cassette;

receive an instruction to change a replenishment quantity for the replenishment process after starting the execution of the replenishment process; and control to change the processing time of the replenishment process based on the instruction.

2. The money handling apparatus according to claim 1, wherein in a case that the processing circuitry receives an instruction to end the replenishment process during the execution of the replenishment process, the processing circuitry is configured to control to end the replenishment process based on the instruction.

3. The money handling apparatus according to claim 1, wherein in a case that the processing circuitry receives an instruction to perform a minimum replenishment process, in which a combination of a plurality of denominations of money is designated as money with which the storage units are to be replenished, the processing circuitry is configured to perform the minimum replenishment process, and a total amount of the combination of the plurality of denominations of money is a maximum amount as change that may be dispensed in one transaction.

4. The money handling apparatus according to claim 3, wherein after completion of the minimum replenishment processing, the processing circuitry is further configured to resume and complete the replenishment process in response to receiving an instruction to resume the replenishment process.

5. The money handling apparatus according to claim 1, further comprising:

a display configured to display a time required until the replenishment process is ended.

6. The money handling apparatus according to claim 1, wherein the processing circuitry is further configured to force termination of the replenishment process in response to receiving an instruction to force termination of the replenishment process.

7. The money handling apparatus according to claim 1, wherein the processing circuitry is further configured to control performance of a depositing process.

8. The money handling apparatus according to claim 7, further comprising:

recognition circuitry configured to recognize items of money deposited to the money handling apparatus during the depositing process, wherein each storage unit of the plurality of storage units stores a different denomination of money, and the processing circuitry controls performance of the depositing process by controlling each item of money to be deposited to a storage unit corresponding to the denomination of the item of money.

9. The money handling apparatus according to claim 1, wherein the processing circuitry is further configured to control performance of the dispensing process, and the dispensing process includes dispensing money from at least one storage unit of the plurality of storage units.

10. The money handling apparatus according to claim 9, wherein the dispensed money in the dispensing process is discharged through an opening of the money handling apparatus.

11. A money handling apparatus to perform a dispensing process, the money handling apparatus comprising:

a storage cassette to store money for a replenishment process;

a plurality of storage units to store money; and processing circuitry configured to control performance of a depositing process including recognizing items of money deposited to the money handling apparatus, and controlling each item of money to be deposited to a storage unit corresponding to the denomination of the item of money;

receive a designation of a processing time of the replenishment process;

control, based on the processing time, performance of the replenishment process so that a storage unit of the plurality of storage units is replenished with money fed out from the storage cassette;

receive an instruction to change a replenishment quantity for the replenishment process after starting the performance of the replenishment process; and control to change the processing time of the replenishment process based on the instruction.

12. The money handling apparatus according to claim 11, wherein in a case that the processing circuitry receives an instruction to end the replenishment process during execution of the replenishment process, the processing circuitry is configured to control to end the replenishment process based on the instruction.

13. The money handling apparatus according to claim 11, wherein in a case that the processing circuitry receives an instruction to perform a minimum replenishment process, in which a combination of a plurality of denominations of money is designated as money with which the storage units are to be replenished, the processing circuitry is configured to perform the minimum replenishment process, and a total amount of the combination of the plurality of denominations of money is a maximum amount as change that may be dispensed in one transaction.

14. The money handling apparatus according to claim 13, wherein after completion of the minimum replenishment processing, the processing circuitry is further configured to resume and complete the replenishment process in response to receiving an instruction to resume the replenishment process.

15. The money handling apparatus according to claim 11, wherein the processing circuitry is further configured to control performance of the dispensing process, and the dispensing process includes dispensing money from at least one storage unit of the plurality of storage units.

16. The money handling apparatus according to claim 11, wherein the processing circuitry is further configured to force termination of the replenishment process in response to receiving an instruction to force termination of the replenishment process.

17. A money handling apparatus to perform a dispensing process, the money handling apparatus comprising:

a storage cassette detachably mounted to the money handling apparatus to store money for a replenishment process;

a plurality of storage units to store money; and processing circuitry configured to receive a designation of a processing time of the replenishment process;

control execution of the replenishment process based on the processing time so that a storage unit of the plurality of storage units is replenished with money fed out from the storage cassette; and control the execution of the replenishment process to end, irrespective of a replenishment status of the storage unit, in a case that the processing time has elapsed.

18. The money handling apparatus according to claim 17, wherein the processing circuitry receives, from a user, a selection indicating whether to continue the replenishment process after the designated processing time has elapsed.

19. The money handling apparatus according to claim 18, wherein in a case that the user selects to continue the replenishment process and designates an additional processing time, the processing circuitry continues the replenishment process for the additional processing time after the designated processing time has elapsed.

20. The money handling apparatus according to claim 18, wherein in a case that the user selects to continue the replenishment process, the processing circuitry continues the replenishment process for another iteration of designated processing time after the designated processing time has elapsed.

* * * * *